United States Patent
Ito

(10) Patent No.: US 7,035,035 B2
(45) Date of Patent: Apr. 25, 2006

(54) METHOD OF AND APPARATUS FOR CORRECTING DATA RECORDING POSITION ON RECORDING MEDIUM

(75) Inventor: Masahiro Ito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 71 days.

(21) Appl. No.: 10/685,295

(22) Filed: Oct. 14, 2003

(65) Prior Publication Data

US 2004/0114269 A1   Jun. 17, 2004

(30) Foreign Application Priority Data

Oct. 18, 2002   (JP) ............................. 2002-303892

(51) Int. Cl.
- *G11B 21/02*   (2006.01)
- *G11B 19/02*   (2006.01)
- *G11B 5/09*   (2006.01)

(52) U.S. Cl. ............................. 360/75; 360/69; 360/51
(58) Field of Classification Search ................. 360/51, 360/31, 75, 77.04, 77.08
See application file for complete search history.

(56) References Cited

U.S. PATENT DOCUMENTS

| 2001/0021075 A1* | 9/2001 | Kitazaki et al. ............... 360/51 |
| 2002/0149868 A1* | 10/2002 | Nakasato ..................... 360/51 |

FOREIGN PATENT DOCUMENTS

JP   4-251440   9/1992

* cited by examiner

*Primary Examiner*—Andrew L. Sniezek
(74) *Attorney, Agent, or Firm*—Greer, Burns & Crain, Ltd.

(57) ABSTRACT

A first time interval between reference signals is measured when there is no shift in a center of rotation of a recording medium. A second time interval between reference signals recorded on the recording medium is measured when there is a shift in the center of rotation of the recording medium. A correction value of a data write time interval for writing data to the recording medium is computed, based on the first time interval and a second time interval. Data is written to the recording medium based on the correction value.

16 Claims, 5 Drawing Sheets

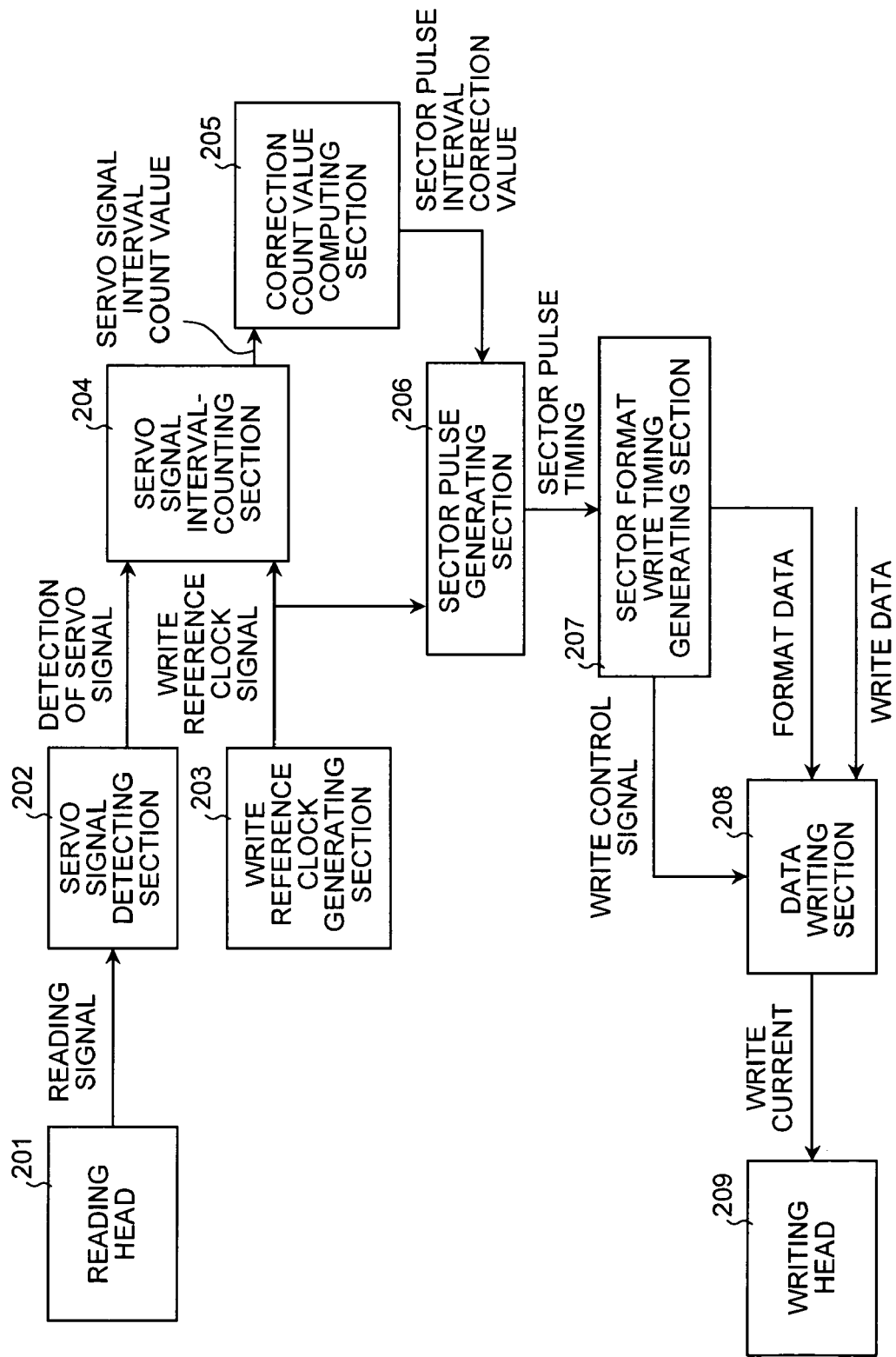

METHOD OF AND APPARATUS FOR CORRECTING DATA RECORDING POSITION ON RECORDING MEDIUM

BACKGROUND OF THE INVENTION

1) Field of the Invention

The present invention relates to a technology for correcting a shift, in a recording position on a recording medium, arising due to a shift in a center of rotation of the recording medium.

2) Description of the Related Art

A servo signal is used to position a magnetic head on a recording medium in a magnetic disk apparatus. Over the years, the number of tracks on the recording media have increased in response to a need for improving the recording density. Consequently, the time to write the servo signal on the track (hereinafter, "write time of the servo signal") has increased and has led to a decline in the productivity of the magnetic disks.

One approach to write the servo signal is to incorporate the recording medium in the magnetic disk apparatus, and write the servo signal on the recording medium with the head. However, in this case, since writing of the servo signal is performed by each magnetic disk apparatus separately, the structure of the magnetic disk apparatus becomes complicated and the cost also increases.

Japanese Patent Laid-Open Publication No. H4-251440 (see page 2) discloses a technology to write the servo signal, by means of, for example, magnetic transcription. The writing of the servo signal is performed collectively. Precisely, a master disk on which the servo signal is recorded is attached to other disks, and a magnetic field is applied to the disks. As a result, the servo signal is batch-transcribed to the other disks.

Sometimes the center of rotation of the recording medium shifts from the true center of rotation when the recording medium is incorporated in the magnetic disk apparatus. When there is a shift in the center of rotation, the recording medium rotates with respect to the head at a speed that is different from the desired speed. As a result, the head is positioned on the recording medium at a position that is different from the desired position (hereinafter, "shift in the data writing position"). The shift in the center of rotation of the recording medium may be caused of an external impact.

One approach to take into account the shift in the data writing position due to the shift in the center of rotation is to increase a space between sectors on the recording medium.

SUMMARY OF THE INVENTION

It is an object of the invention to at least solve the problems in the conventional technology.

A magnetic disk apparatus according to one aspect of the present invention includes a rotating unit that rotates a recording medium; a storage unit that stores a first time interval that is a time interval between reference signals measured when there is no shift in a center of rotation of the recording medium; a reference signal time interval measuring unit that measures, while the rotating unit rotates the recording medium, a second time interval that is a time interval between reference signals recorded on the recording medium when there is a shift in the center of rotation of the recording medium; a correction value computing unit that computes, based on the first time interval and the second time interval, a correction value of a data write time interval for writing data to the recording medium; and a data writing unit that writes data to the recording medium based on the correction value.

A method of correcting a data recording position on a recording medium in a magnetic disk apparatus, according to another aspect of the present invention includes storing a first time interval that is a time interval between reference signals measured when there is no shift in a center of rotation of the recording medium; measuring a second time interval between reference signals recorded on the recording medium, while the recording medium is being rotated, when there is a shift in the center of rotation of the recording medium; computing a correction value of a data write time interval for writing data to the recording medium, based on the first time interval and a second time interval; and writing data to the recording medium based on the correction value.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 2 is a functional block diagram of a magnetic disk apparatus according to the embodiment of the present invention;

DETAILED DESCRIPTIONS

Exemplary embodiments of the apparatus and the method according to the present invention are explained below, while referring to the accompanying drawings.

Figure 1A:
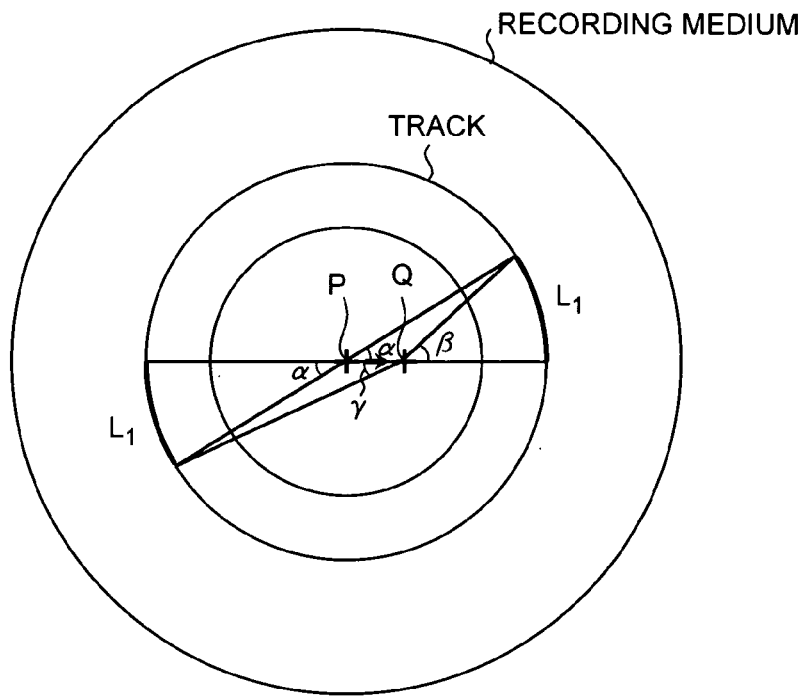
FIG. 1A and FIG. 1B illustrate the concept of a shift in the recording position in a magnetic disk apparatus according to an embodiment of the present invention.
Figure 1B:
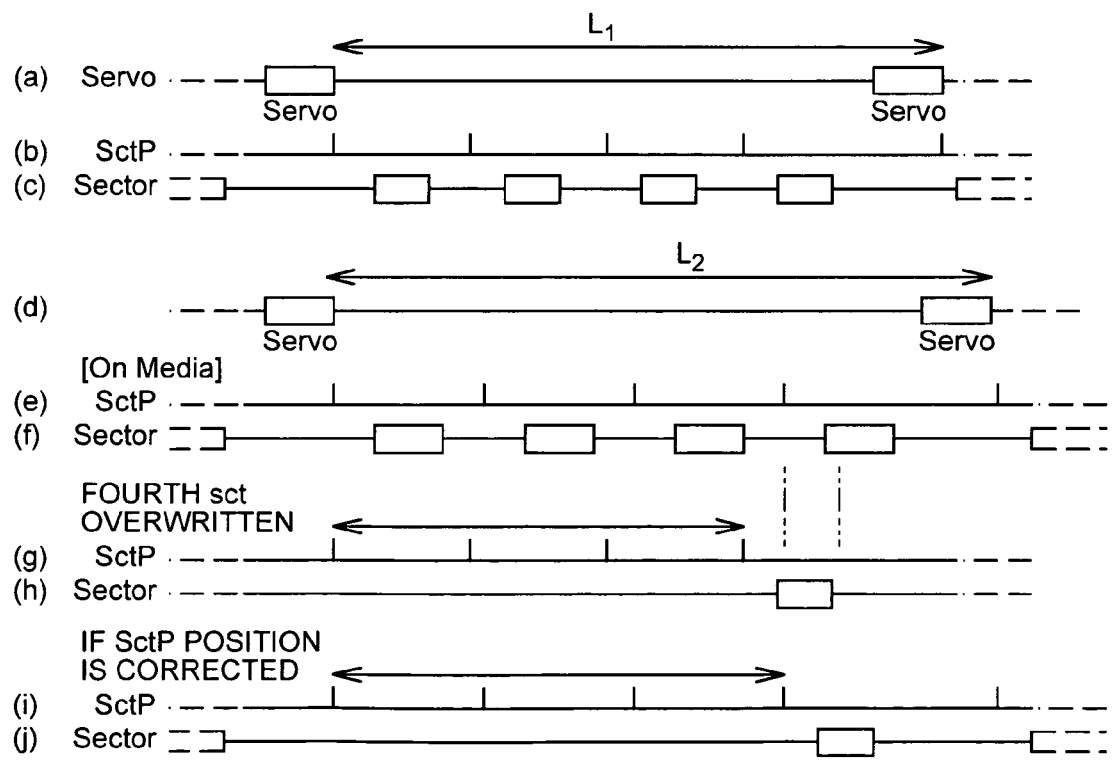

FIG. 1A and FIG. 1B illustrate the concept of a shift in the recording position in the magnetic disk apparatus according to an embodiment of the present invention.

As shown in FIG. 1A, P is a true center of rotation and Q is a shifted center of rotation of the recording medium. L1 is the length of circumference corresponding to an angle of rotation $\alpha$. When the center of rotation of the recording medium shifts from P to Q, the angle of rotation corresponding to the length L1 on the circumference changes, according to the position on the track, to either $\beta$ or $\gamma$. Similarly, the length on the circumference corresponding to a constant angle of rotation, say $\alpha$, changes according to the position on the track.

That is, in the periphery close to Q, the length of the circumference corresponding to the angle of rotation $\beta$ is L1. Therefore, the length of the circumference corresponding to the angle of rotation $\alpha$, which is smaller than the angle of rotation $\beta$, is less than L1. On the other hand, in the periphery farther from Q, the length of the circumference corresponding to the angle of rotation $\gamma$ is L1. Therefore, the length of the circumference corresponding to the angle of rotation $\alpha$, which is greater than the angle of rotation $\gamma$, is more than L1.

In this way, in a magnetic disk apparatus, a shift in the center of rotation of the recording medium either prolongs or shortens the time required for the recording medium to go past the head in the apparent circumferential direction.

Referring to FIG. 1B, let us assume that a servo signal (Servo) is recorded at an interval of length L1 on the track as illustrated by (a), a sector pulse (SctP) is recorded as illustrated by (b), and a sector (Sector) is recorded as illustrated by (c). Then in the circumference having an extended length on a time axis in an apparent circumferential direction because of the shift in the center of rotation of the recording medium, the following changes occur. There is a prolongation of the interval between the servo signals from L1 to L2 as illustrated by (d), a prolongation of the interval between the sector pulses as illustrated by (e), and an extension of space between the sectors as illustrated by (f).

For example, assume that data is to be written to the fourth sector. In that case, if the shift is not taken into account, sector pulses will be assumed as illustrated by (g), and the data for the fourth sector is written at the position as illustrated by (h). As a result, the data of the fourth sector is written on a position that is different from the desired position (see (f) and (h)).

Thus, the shift in the center of rotation of the recording medium causes the shift in the data writing position. Therefore, in the conventional technology, sufficient space is provided between the sectors to prevent the overwriting of the data. However, this creates a problem in that the recording capacity of the recording medium decreases.

In the present invention, as illustrated by (i) in FIG. 1B, the interval between the sector pulses is corrected if there is a shift in the center of rotation of the recording medium. Because of such correction, the data of the fourth sector will be written at the correct position as illustrated by (j), even if there is a shift in the center of rotation of the recording medium.

FIG. 2 is a functional block diagram of the magnetic disk apparatus according to the embodiment. The magnetic disk apparatus includes a reading head 201, a servo signal detecting section 202, a write reference clock generating section 203, a servo signal interval counting section 204, a correction count value computing section 205, a sector pulse generating section 206, a sector format write timing generating section 207, a data writing section 208, and a writing head 209.

The reading head 201 is a magnetic head that reads the servo signal, the sector pulse, the data etc., recorded on the recording medium, and passes the read information (hereinafter, "reading signal") to the servo signal detecting section 202.

The servo signal detecting section 202, amplifies and demodulates the reading signal, detects the servo signals and notifies the servo signal interval counting section 204 when the servo signal is detected.

The write reference clock generating section 203 generates clock signals that act as a reference when writing data to the recording medium. The write reference clock signal generated by the write reference clock generating section 203 is used as the reference signal to measure time in the servo signal interval counting section 204 and the sector pulse generating section 206.

The servo signal interval counting section 204 measures the time interval between the servo signals by counting the number of write reference clock signals between two servo signals detected by the servo signal detecting section 202.

The correction count value computing section 205 computes the correction value of the interval between the sector pulses based on the expansion value of the track. The expansion value of the track is computed by comparing the time interval between the servo signal measured by the servo signal interval counting section 204 and the time interval measured at the time when the servo signal is recorded on the recording medium. More specifically, the correction count value computing section 205 outputs the correction value of the interval between the sector pulses as the count value of the write reference clock signal.

In other words, the correction count value computing section 205 computes the correction value between the sector pulses based on the shift of the measured time interval between the servo signal from the estimated value. The data writing section 208 writes data to the recording medium based on the computed correction value. Even if the center of rotation of the recording medium shifts, the data is written to the correct position with the help of the correction count value computing section 205 and the data writing section 208.

The sector pulse generating section 206 generates the sector pulses based on the correction value of the interval between the sector pulses computed by the correction count value computing section 205. The sector pulse generating section 206 then notifies the timing of generation of the sector pulses to the sector format write timing generating section 207.

The sector format write timing generating section 207 generates a format data and a write control signal of the write data, based on the timing of the sector pulses is generated by the sector pulse generating section 206.

The data writing section 208 modulates the format data or the write data and generates a write current, based on the write control signal generated by the sector format write timing generating section 207. The writing head 209 then uses this write current to write the data to the recording medium.

The writing head 209 is a magnetic head that writes the format data and the write data to the recording medium, according to the write current generated by the data writing section 208.

Figure 3:
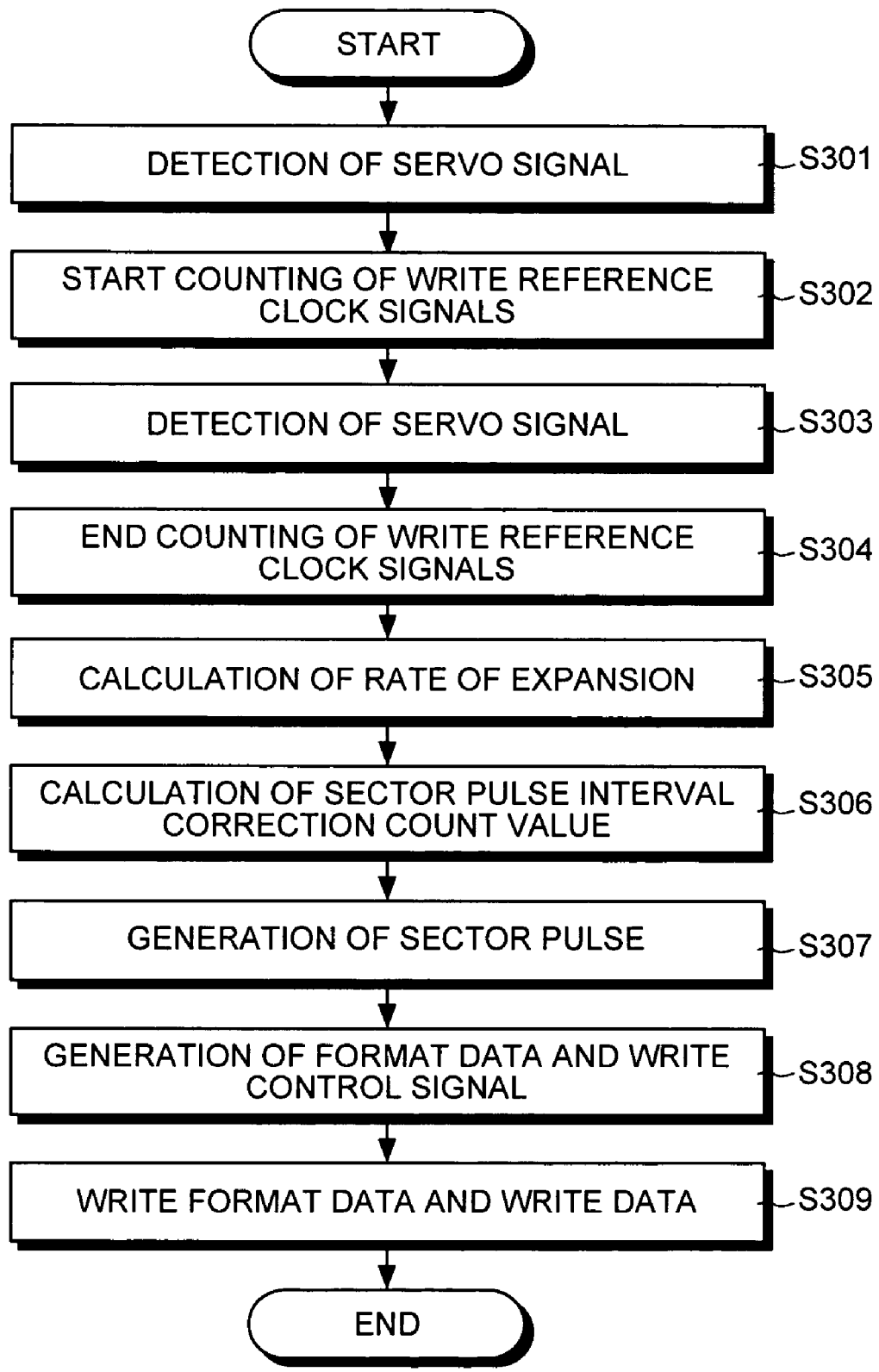
FIG. 3 is a flowchart of a process of correcting a data recording position.

FIG. 3 is a flowchart of a process of the data recording position correction in the magnetic disk apparatus according to the embodiment.

When certain condition is fulfilled, the servo signal detecting section 202 detects the servo signal (Step S301) and notifies the same to the servo signal interval counting section 204.

Next, the servo signal interval counting section 204 starts counting the write reference clock signals (Step S302). When the servo signal detecting section 202 detects the next servo signal (Step S303), the servo signal interval counting section 204 stops counting the write reference clock signals (Step S304) and notifies the count value to the correction count value computing section 205.

Next, the correction count value computing section 205 computes the time interval between the servo signals, from the servo signal interval count value. Following this, the correction count value computing section 205 computes the rate of expansion of the track, based on the time interval between the servo signals computed and the estimated time interval when the servo signal is written to the recording medium (Step S305).

The correction count value computing section 205 then computes, from the rate of expansion, the correction value of the interval between the sector pulses (Step S306). The sector pulse generating section 206 generates the sector pulses based on this correction value (Step S307), and notifies the timing of each sector pulse generated to the sector format write timing generating section 207.

Based on the timing of the sector pulses notified, the sector format write timing generating section 207 generates the format data and the write control signal of the write data (Step S308). The data writing section 208 then writes the format data and the write data by using the writing head 209 (Step S309).

To summarize, the servo signal interval counting section 204 measures the time interval between the servo signals. The correction count value computing section 205 computes the correction value of the interval between the sector pulses, based on the time interval measured. Based on this correction value, the data writing section 208 writes the data to the recording medium. Hence, even if there is a shift in the center of rotation of the recording medium, the data is written at a correct position.

The above embodiment explains a case in which the correction of writing position is writing of data is performed for each sector. However, the present invention can also be applied to cases in which, writing positions of all the sectors are corrected first and then the data is written.

Further, the above embodiment explains a case in which the rate of expansion of the track is computed using the time interval between the servo signals recorded on the recording medium. However, the present invention can also be applied to cases in which the rate of expansion of the track is computed using a duration for which the servo signal continues (hereinafter, "dwelltime of the servo signal") or the time interval between specific sections within a sector.

Since the main reasons for the shift in the center of rotation of the recording medium is an external impact, a method to detect whether there is an external impact is explained next.

Figure 4:
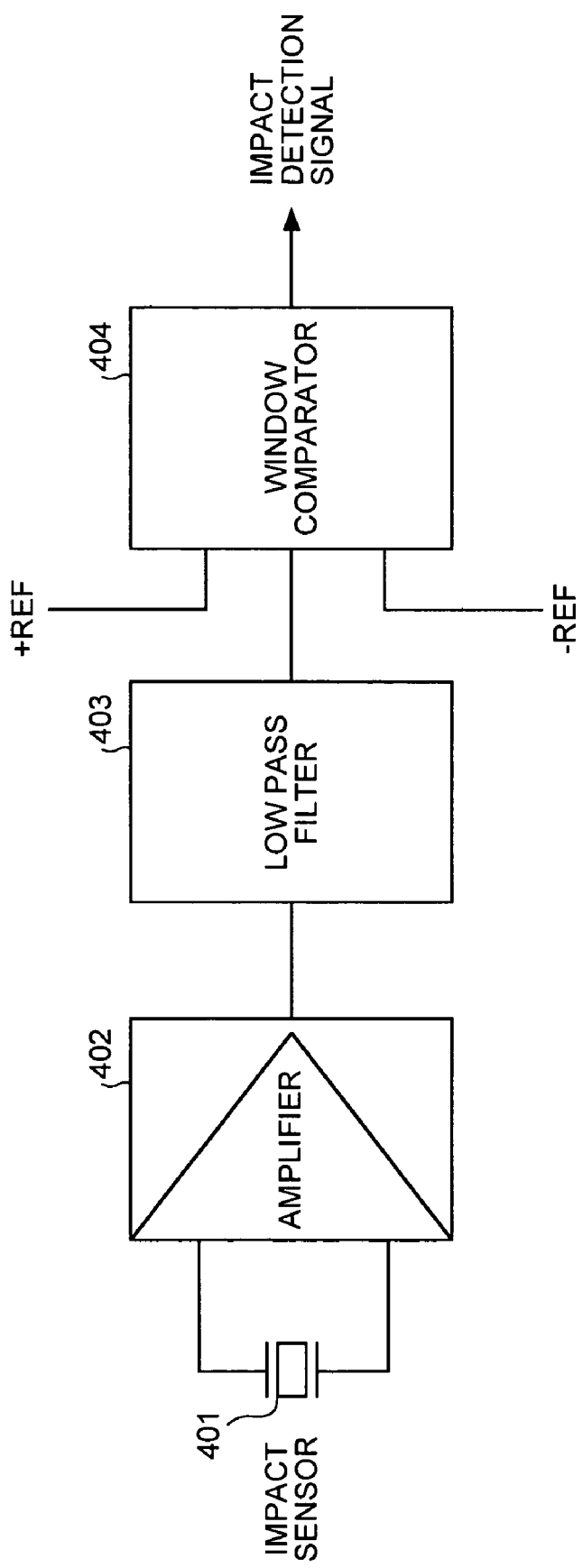
FIG. 4 illustrates an example of an impact sensor circuit.

FIG. 4 illustrates an example of an impact sensor circuit that detects an external impact. This impact sensor circuit comprises an impact sensor 401, an amplifier 402, a low pass filter 403, and a window comparator 404.

The impact sensor 401 outputs an impact signal when it detects an external impact to the magnetic disk apparatus. The amplifier 402 amplifies the impact signal output from the impact senor 401.

The low pass filter 403 removes the noise from the impact signal. The window comparator 404 compares the impact signal with a specific threshold (REF) and decides a magnitude of the impact.

If the magnitude of the external impact is greater than a predetermined threshold, the external impact may cause a shift in the center of rotation of the recording medium. Therefore, if the magnitude of the external impact is greater than the predetermined threshold, the process shown in FIG. 3 is carried out. The threshold of the magnitude of the external impact may be determined with experiments.

Another approach for detecting the magnitude of the external impact is to provide a voice coil motor and gauge the change in the counter-electromotive force generated in the voice coil motor. In fact, a voice coil motor is generally used to move the head of the magnetic disk apparatus. If this voice coil motor is used, then there is no need to provide a separate voice coil motor for detecting the magnitude of the external impact.

Figure 5:
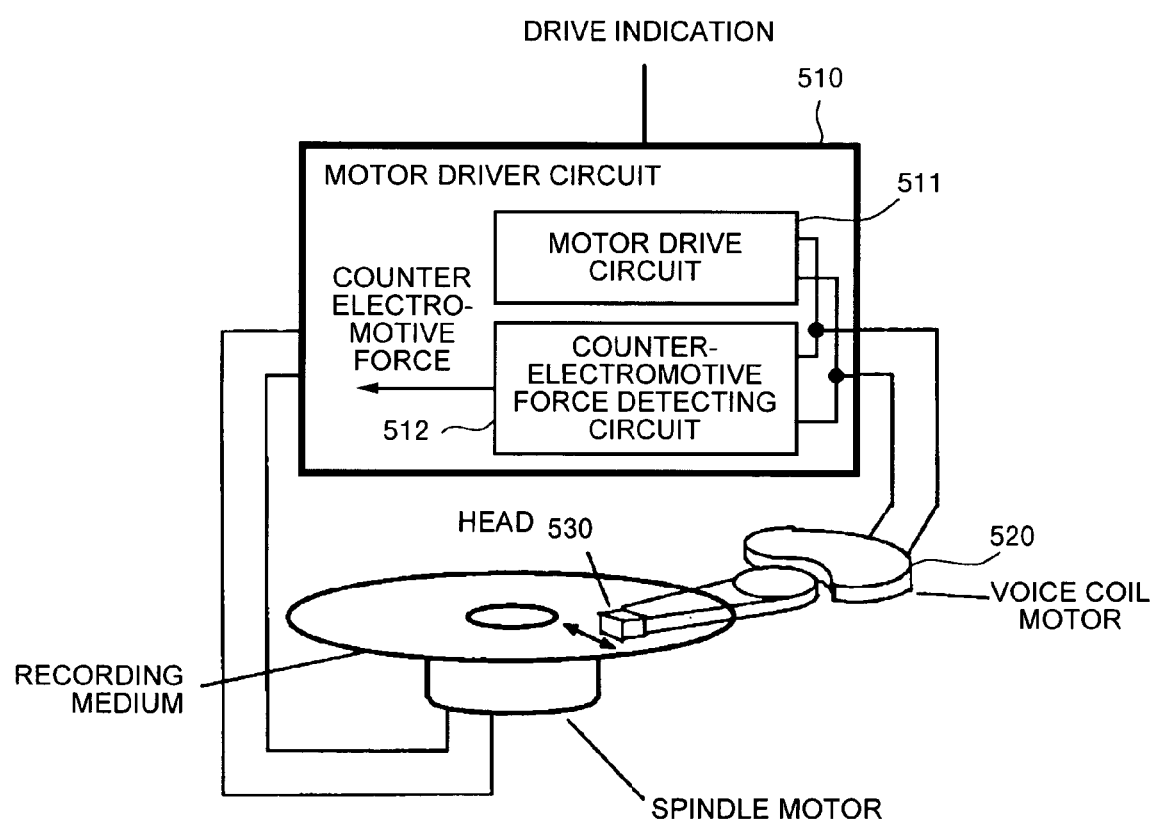
FIG. 5 illustrates an example of a circuit that detects a counter-electromotive force generated in a voice coil motor.

FIG. 5 illustrates an example of a circuit that detects the counter-electromotive force generated in the voice coil motor. The motor driver circuit 510 includes a motor drive circuit 511 and a counter-electromotive force detecting circuit 512. The motor driver circuit 510 moves a head 530 by starting a voice coil motor 520, based on the drive instruction received from a micro processing unit (MPU). By setting up a parallel circuit of a motor drive circuit 511 and a counter-electromotive force detecting circuit 512 as provided in the motor driver circuit 510, it is possible to detect the counter electromotive force generated in the voice coil motor 520.

According to the present invention, a correction value of the data write time interval is computed, based on the true time interval between the reference signals and real time interval between the reference signals, and position where to write the data on the recording medium is adjusted based on the correction value. Thus, the change in the position in accordance with the shift in the center of rotation of the recording medium is corrected.

In this manner, since there is no need to provide additional space between the sectors, more area of the recording medium is available for data recording. This leads to an increase in the recording capacity of the recording medium, or a decrease in the recording density.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A magnetic disk apparatus comprising:
a rotating unit that rotates a recording medium;
a storage unit that stores a first time interval that is a time interval between reference signals measured when there is no shift in a center of rotation of the recording medium;
a reference signal time interval measuring unit that measures, while the rotating unit rotates the recording medium, a second time interval that is a time interval between reference signals recorded on the recording medium when there is a shift in the center of rotation of the recording medium;
a correction value computing unit that computes, based on the first time interval and the second time interval, a correction value of a data write time interval for writing data to the recording medium; and
a data writing unit that writes data to the recording medium based on the correction value.

2. The magnetic disk apparatus according to claim 1, wherein the correction value computing unit comprises:
a time interval computing unit that computes a rate of expansion, based on the first time interval and the second time interval; and
a sector pulse interval computing unit that computes, based on the rate, the correction value.

3. The magnetic disk apparatus according to claim 1, wherein the reference signals are servo signals.

4. The magnetic disk apparatus according to claim 1, further comprising a shift detecting unit that detects occurrence of the shift.

5. The magnetic disk apparatus according to claim 4, wherein the shift detecting unit includes an impact sensor.

6. The magnetic disk apparatus according to claim 4, wherein the shift detecting unit includes a voice coil motor, wherein a counter-electromotive force of the voice coil motor changes in accordance with the shift.

7. The magnetic disk apparatus according to claim 4, wherein the shift detecting unit measures either of the time interval between the reference signals, a dwelltime of the reference signals, and a time interval between specific sections within a sector on the recording medium, to thereby detect the shift.

8. The magnetic disk apparatus according to claim 7, further comprising a power supply unit, wherein
the shift detecting unit measures, when power supply unit is turned on, either of the time interval between the reference signals, a dwelltime of the reference signals, and a time interval between specific sections within a sector on the recording medium, to thereby detect the shift.

9. The magnetic disk apparatus according to claim 7, wherein a space provided between sectors is such that, when the shift occurs, the specific sections within one sector do not overlap with specific sections within other sector.

10. A method for correcting a data recording position on a recording medium in a magnetic disk apparatus, comprising:
storing a first time interval that is a time interval between reference signals measured when there is no shift in a center of rotation of the recording medium;
measuring a second time interval between reference signals recorded on the recording medium, while the recording medium is being rotated, when there is a shift in the center of rotation of the recording medium;
computing a correction value of a data write time interval for writing data to the recording medium, based on the first time interval and a second time interval; and
writing data to the recording medium based on the correction value.

11. The method according to claim 10, wherein the computing comprises computing a rate of expansion, based on the first time interval and the second time interval, and computing the correction value based on the rate.

12. The method according to claim 10, further comprising detecting occurrence of the shift.

13. The method according to claim 12, wherein the detecting includes detecting whether there is the shift using an impact sensor.

14. The method according to claim 12, wherein the detecting includes detecting whether there is the shift by detecting a change in a counter-electromotive force of a voice coil motor.

15. The method according to claim 12, wherein the detecting includes measuring either of the time interval between the reference signals, a dwelltime of the reference signals, and a time interval between specific sections within a sector on the recording medium.

16. The method according to claim 12, further comprising supplying power to the magnetic disk apparatus, wherein the detecting includes measuring the time interval between the reference signals or the dwelltime of the reference signals or the time interval between specific sections within a sector.

* * * * *